United States Patent
Toyoda (10) Patent No.: US 9,694,813 B2
(45) Date of Patent: *Jul. 4, 2017

(54) AUTONOMOUS VEHICLE OPERATION WITHIN A CENTER TURN LANE

(71) Applicant: Toyota Motor Engineering & Manufacturing North America, Inc., Erlanger, KY (US)

(72) Inventor: Heishiro Toyoda, Ann Arbor, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/834,453

(22) Filed: Aug. 25, 2015

(65) Prior Publication Data

US 2017/0057496 A1 Mar. 2, 2017

(51) Int. Cl.
*B60W 30/09* (2012.01)
*B60W 50/14* (2012.01)
(Continued)

(52) U.S. Cl.
CPC .......... *B60W 30/09* (2013.01); *B60W 10/04* (2013.01); *B60W 10/20* (2013.01); *G05D 1/0088* (2013.01);
(Continued)

(58) Field of Classification Search
CPC ...... B60W 30/09; B60W 30/16; B60W 50/14; B60W 30/18154; B60W 10/04;
(Continued)

(56) References Cited

U.S. PATENT DOCUMENTS 8,457,827 B1 6/2013 Ferguson et al.
8,712,624 B1* 4/2014 Ferguson ........ B60W 30/18154
701/117
(Continued)

FOREIGN PATENT DOCUMENTS

JP 2013041389 A 2/2013

OTHER PUBLICATIONS

U.S. Appl. No. 14/581,757, filed Dec. 23, 2014.

*Primary Examiner* — Yuri Kan
(74) *Attorney, Agent, or Firm* — Christopher G. Darrow; Darrow Mustafa PC (57) ABSTRACT

Operations of an autonomous vehicle while waiting to make a turn from a center turn lane are described. In response to determining that the detected object intends on turning through the center turn lane from a transverse direction, it can be determined whether an object turning path for the detected object would impinge upon the autonomous vehicle in the center turn lane. If the object turning path would impinge upon the autonomous vehicle, determining a driving maneuver for the autonomous vehicle that would move the autonomous vehicle to a new position within the center turn lane to allow the autonomous vehicle to make the turn according to an adjusted vehicle turning path while also allowing the detected object to turn through the center turn lane according to an adjusted object turning path without impinging upon the autonomous vehicle. The autonomous vehicle can be caused to implement the determined driving maneuver.

20 Claims, 4 Drawing Sheets

(51) Int. Cl.
*B60W 30/16* (2012.01)
*G05D 1/00* (2006.01)
*B60W 10/04* (2006.01)
*B60W 10/20* (2006.01)

(52) U.S. Cl.
CPC ..... *B60W 2550/30* (2013.01); *B60W 2710/20* (2013.01); *B60W 2720/10* (2013.01)

(58) Field of Classification Search
CPC ...... G05D 1/0212; G01C 21/26; G01C 21/32; G08G 1/0104
USPC .................................................. 701/23, 301
See application file for complete search history.

(56) References Cited

U.S. PATENT DOCUMENTS

| | | | |
|---|---|---|---|
| 9,081,383 B1* | 7/2015 | Montemerlo | G05D 1/0246 |
| 2005/0004753 A1* | 1/2005 | Weiland | G01C 21/32 |
| | | | 701/532 |
| 2008/0162027 A1* | 7/2008 | Murphy | B60W 50/14 |
| | | | 701/117 |
| 2011/0010094 A1* | 1/2011 | Simon | B60W 30/16 |
| | | | 701/301 |
| 2011/0106416 A1* | 5/2011 | Scofield | G08G 1/0104 |
| | | | 701/119 |
| 2013/0190944 A1* | 7/2013 | Brandin | G01C 21/26 |
| | | | 701/1 |
| 2014/0067206 A1* | 3/2014 | Pflug | B60W 10/04 |
| | | | 701/41 |
| 2016/0176398 A1* | 6/2016 | Prokhorov | B60W 30/09 |
| | | | 701/23 |

* cited by examiner

AUTONOMOUS VEHICLE OPERATION WITHIN A CENTER TURN LANE

FIELD

The subject matter described herein relates in general to vehicles having an autonomous operational mode and, more particularly, to the operation of such vehicles within a center turn lane.

BACKGROUND

Some vehicles include an operational mode in which a computing system is used to navigate and/or maneuver the vehicle along a travel route with minimal or no input from a human driver. Such vehicles include sensors that are configured to detect information about the surrounding environment, including the presence of objects in the environment. The computing systems are configured to process the detected information to determine how to navigate and/or maneuver the vehicle through the surrounding environment.

SUMMARY

In one respect, the present disclosure is directed to a method of operating an autonomous vehicle while waiting to make a turn from a center turn lane. The method can include detecting an object in the external environment of the autonomous vehicle. The method can also include determining whether the detected object intends on turning through the center turn lane from a transverse direction. Responsive to determining that a detected object intends on turning through the center turn lane from a transverse direction, the method can include determining whether an object turning path for the detected object would impinge upon the autonomous vehicle in the center turn lane. Responsive to determining that the object turning path for the detected object would impinge upon the autonomous vehicle in the center turn lane, the method can further include determining a driving maneuver for the autonomous vehicle. The driving maneuver can result in the autonomous vehicle being moved to a new position within the center turn lane. In the new position, the autonomous vehicle would still be allowed to make the turn according to an adjusted vehicle turning path. Also, while the autonomous vehicle is in the new position, it would allow the detected object to turn through the center turn lane according to an adjusted object turning path without impinging upon the autonomous vehicle. The method can include causing the autonomous vehicle to implement the determined driving maneuver.

In another respect, the present disclosure is directed to a system for operating an autonomous vehicle waiting to make a turn from a center turn lane. The system can include a sensor system. The sensor system can be configured to detect an object in the external environment of the autonomous vehicle. The system can include a processor operatively connected to the sensor system. The processor can be programmed to initiate executable operations. The executable operations can include determining whether the detected object intends on turning through the center turn lane from a transverse direction. Responsive to determining that a detected object intends on turning through the center turn lane from a transverse direction, the executable operations can include determining whether an object turning path for the detected object would impinge upon the autonomous vehicle in the center turn lane. Responsive to determining that the object turning path for the detected object would impinge upon the autonomous vehicle in the center turn lane, the executable operations can further include determining a driving maneuver for the autonomous vehicle. The driving maneuver would move the autonomous vehicle to a new position within the center turn lane. In the new position, the autonomous vehicle would still be allowed to make the turn according to an adjusted vehicle turning path. Also, while the autonomous vehicle is in the new position, it would allow the detected object to turn through the center turn lane according to an adjusted object turning path without impinging upon the autonomous vehicle. The executable operations can include causing the autonomous vehicle to implement the determined driving maneuver.

In yet another respect, the present disclosure is directed to a computer program product for operating an autonomous vehicle while waiting to turn from a center turn lane. The computer program product comprising a computer readable storage medium having program code embodied therein. The program code executable by a processor to perform a method. The method can include determining whether a detected object intends on turning through the center turn lane from a transverse direction. Responsive to determining that a detected object intends on turning through the center turn lane from a transverse direction, the method can include determining whether an object turning path for the detected object would impinge upon the autonomous vehicle in the center turn lane. Responsive to determining that the object turning path for the detected object would impinge upon the autonomous vehicle in the center turn lane, the method can further include determining a driving maneuver for the autonomous vehicle. The driving maneuver would move the autonomous vehicle to a new position within the center turn lane. In the new position, the autonomous vehicle would still be allowed to make the turn according to an adjusted vehicle turning path. Also, while the autonomous vehicle is in the new position, it would allow the detected object to turn through the center turn lane according to an adjusted object turning path without impinging upon the autonomous vehicle. The method can include causing the autonomous vehicle to implement the determined driving maneuver.

DETAILED DESCRIPTION

This detailed description relates to the operation of an autonomous while waiting to make a turn from a center turn lane. A "center turn lane" includes any travel lane which a vehicle can enter to make a left turn therefrom. One or more travel lanes can be located on each lateral side of the center turn lane. According to arrangements described herein, an autonomous vehicle can detect an object in its external environment and determine whether the detected object intends on turning through the center turn lane from a transverse direction. Responsive to determining that a detected object intends on turning through the center turn lane from a transverse direction, it can be determined whether an object turning path for the detected object would impinge upon the autonomous vehicle in the center turn lane. Responsive to determining that the object turning path for the detected object would impinge upon the autonomous vehicle in the center turn lane, a driving maneuver for the autonomous vehicle can be determined. The driving maneuver can be one that would move the vehicle to a new position within the center turn lane. The new position would allow the autonomous vehicle to make the turn according to an adjusted vehicle turning path. The new position would also allowing the detected object to turn through the center turn lane according to an adjusted object turning path without impinging upon the autonomous vehicle. The present detailed description relates to systems, methods and computer program products that incorporate such features. In at least some instances, such systems, methods and computer program products can improve the performance of the autonomous vehicle and/or the safe operation of the autonomous vehicle.

Figure 2:
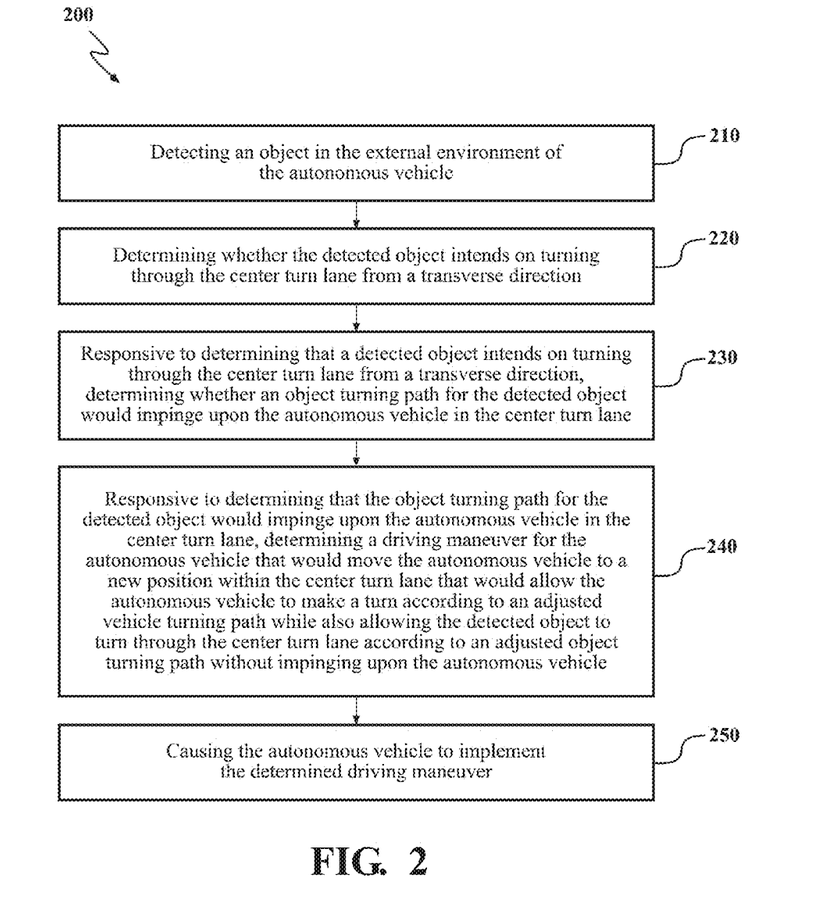
FIG. 2 is an example of a method for operating an autonomous vehicle while waiting to turn from a center turn lane.
Figure 3A:
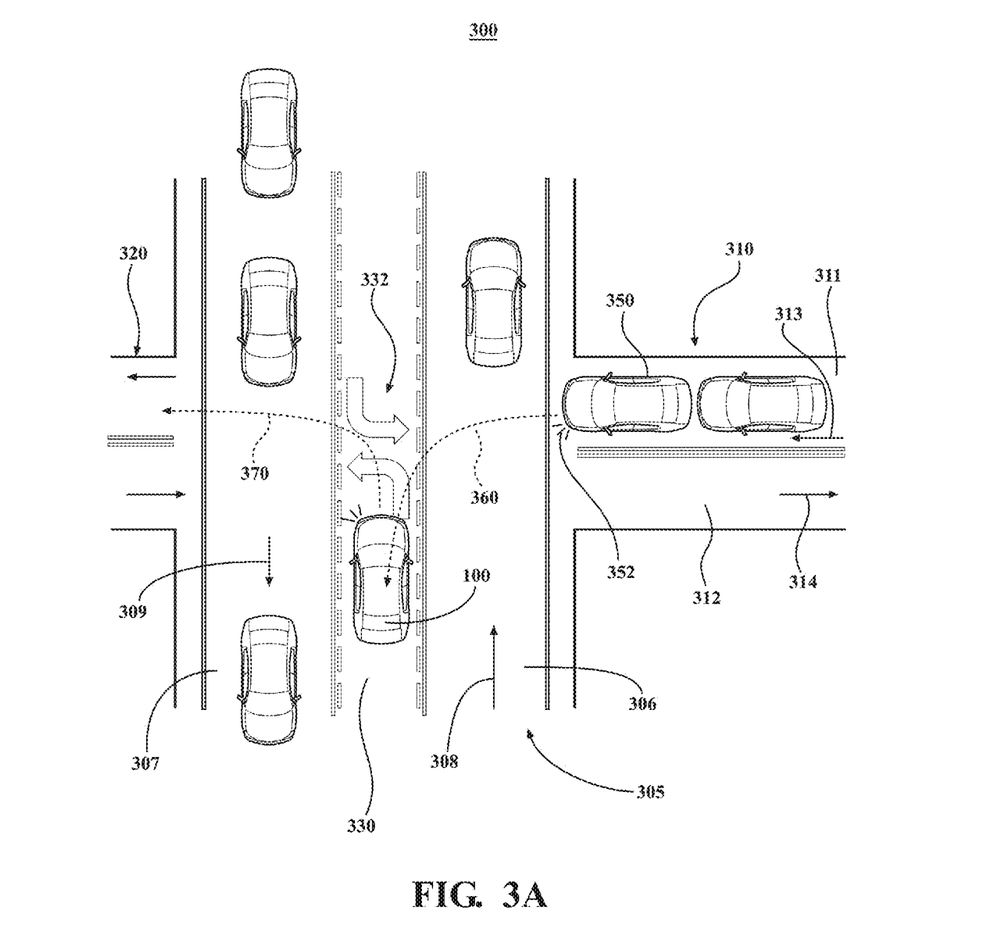
FIG. 3A is an example of a driving environment with a center turn lane, showing a scenario in which an autonomous vehicle is waiting to turn left from the center turn lane and in which another vehicle is waiting to turn left through the center turn lane from a transverse direction.
Figure 3B:
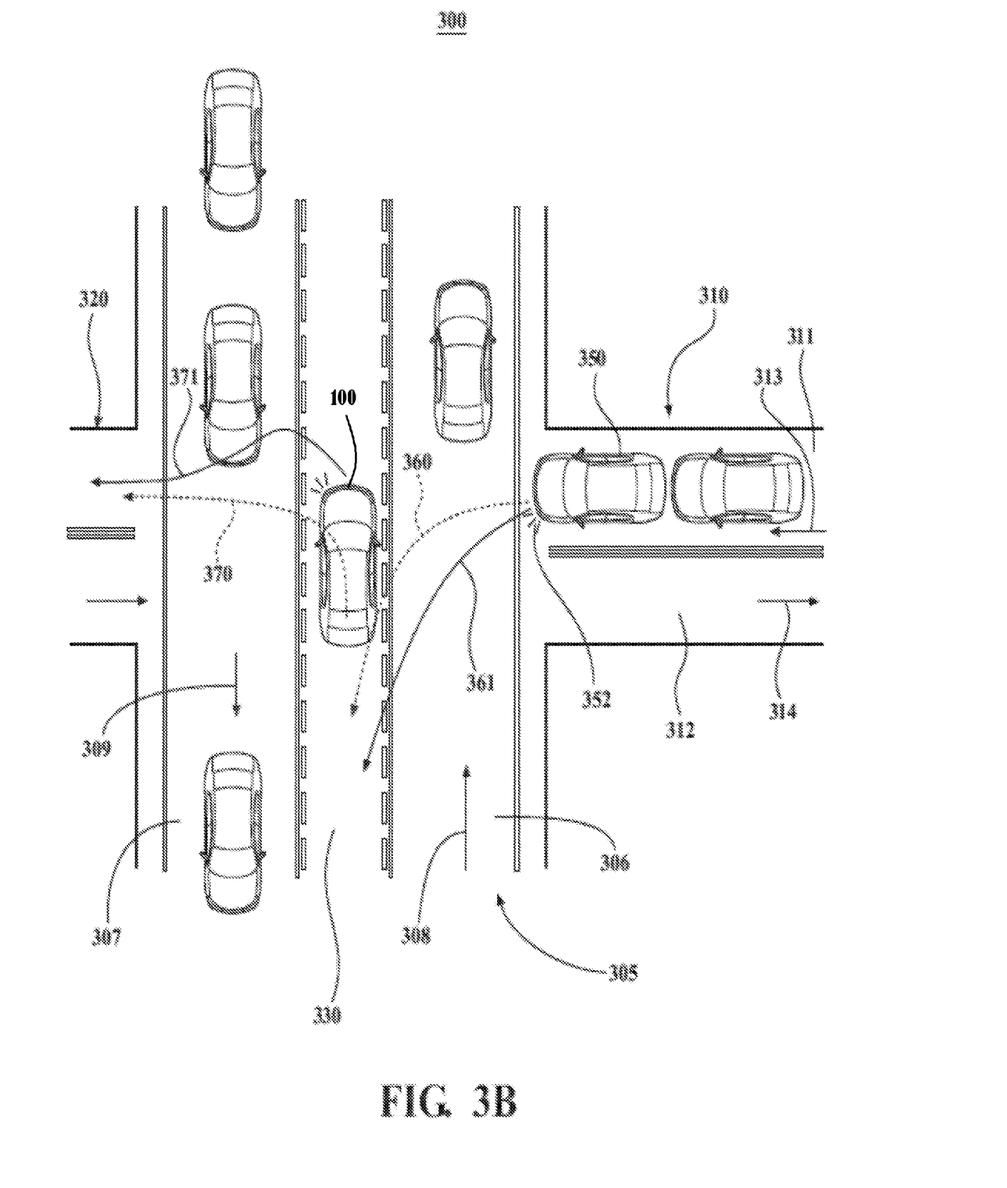
FIG. 3B is an example of the driving environment with the center turn lane of FIG. 3A, showing a subsequent point in time in which the autonomous vehicle implements a driving maneuver in the center turn lane to allow the other vehicle to turn left through the center turn lane while still allowing the autonomous vehicle to make its left turn according to an adjusted vehicle turning path.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-3, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 1:
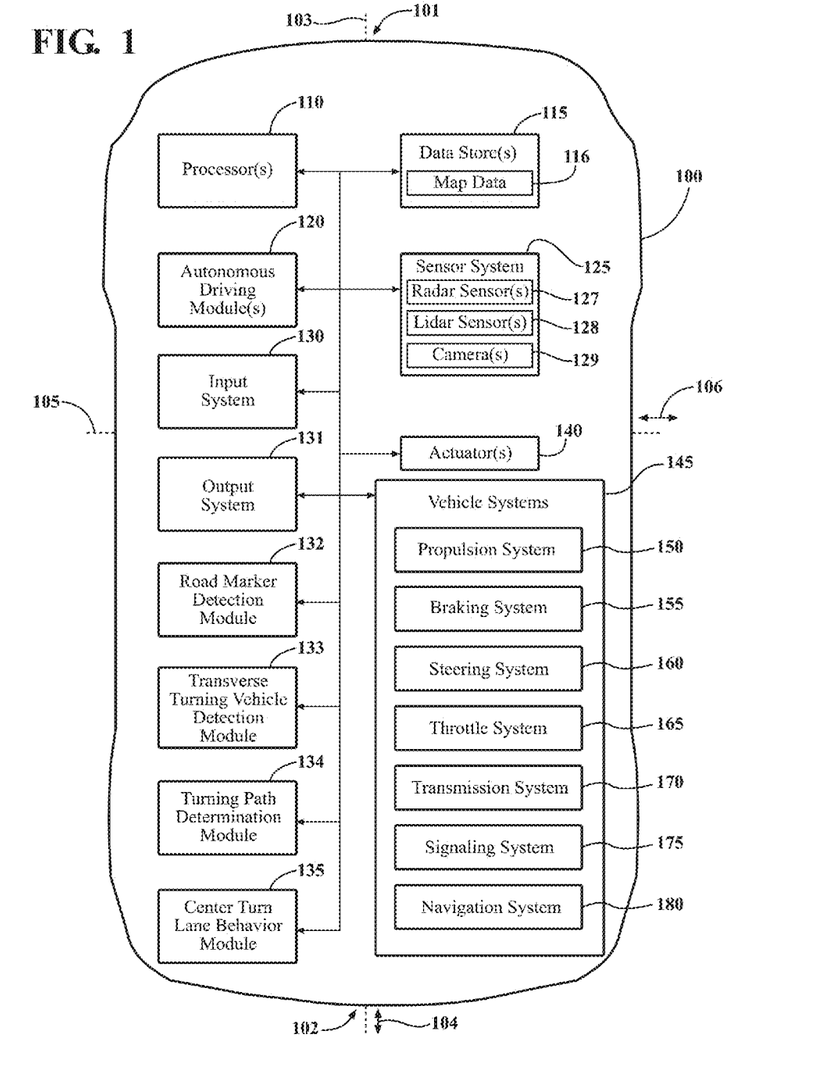
FIG. 1 is an example of an autonomous vehicle.

Referring to FIG. 1, an example of a vehicle 100 is shown. As used herein, "vehicle" means any form of motorized transport. In one or more implementations, the vehicle 100 can be an automobile. While arrangements will be described herein with respect to automobiles, it will be understood that embodiments are not limited to automobiles. In one or more implementations, the vehicle 100 may be a watercraft, an aircraft or any other form of motorized transport. The vehicle 100 can have a front end 101 and a back end 102.

The vehicle 100 can have an associated longitudinal axis 103, which can be the central axis of the vehicle 100. The vehicle 100 can have an associated longitudinal direction 104. "Longitudinal direction" means any direction that is substantially parallel to and/or co-linear with the longitudinal axis 103. The vehicle 100 can have an associated lateral axis 105, which can be substantially perpendicular to the longitudinal axis 103. As used herein, the term "substantially" includes exactly the term it modifies and slight variations therefrom. Thus, the term "substantially perpendicular" means exactly perpendicular and slight variations therefrom. In this particular example, slight variations therefrom can include within normal manufacturing tolerances, within about 10 degrees or less, within about 5 degrees or less, within about 4 degrees or less, within about 3 degrees or less, within about 2 degrees or less, or within about 1 degree or less. The vehicle 100 can have an associated lateral direction 106. "Lateral direction" means any direction that is substantially parallel to and/or co-linear with the lateral axis 105.

According to arrangements herein, the vehicle 100 can be an autonomous vehicle. As used herein, "autonomous vehicle" means a vehicle that configured to operate in an autonomous mode. "Autonomous mode" means that one or more computing systems are used to navigate and/or maneuver the vehicle along a travel route with minimal or no input from a human driver. In one or more arrangements, the vehicle 100 can be highly automated. In some instances, the vehicle 100 can be configured to be selectively switched between an autonomous mode and a manual mode. Such switching can be implemented in any suitable manner, now known or later developed. "Manual mode" means that a majority of the navigation and/or maneuvering of the vehicle along a travel route is performed by a human driver.

The vehicle 100 can include various elements, some of which may be a part of an autonomous driving system. Some of the possible elements of the vehicle 100 are shown in FIG. 1 and will now be described. It will be understood that it is not necessary for the vehicle 100 to have all of the elements shown in FIG. 1 or described herein. The vehicle 100 can have any combination of the various elements shown in FIG. 1. Further, the vehicle 100 can have additional elements to those shown in FIG. 1. In some arrangements, vehicle 100 may not include one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

The vehicle 100 can include one or more processors 110. "Processor" means any component or group of components that are configured to execute any of the processes described herein or any form of instructions to carry out such processes or cause such processes to be performed. The processor 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor 110 can include at least one hardware circuit (e.g., an integrated circuit) configured to carry out instructions contained in program code. In arrangements in which there is a plurality of processors 110, such processors can work independently from each other or one or more processors can work in combination with each other. In one or more arrangements, the processor 110 can be a main processor of the vehicle 100. For instance, the processor 110 can be an engine control unit (ECU).

The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor 110, or the data store 115 can be operatively connected to the processor 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. The map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360 degree ground views. The map data 116 can be highly detailed. In some instances, the map data 116 can be located onboard the vehicle 100. Alternatively, at least a portion of the map data 116 can be located in a data store or source that is remote from the vehicle 100. The map data 116 can include terrain data. The terrain data can include information about the terrain of one or more geographic areas. The terrain data can include elevation data in the one or more geographic areas. In some instances, the terrain data can be located onboard the vehicle 100. The map data 116 can include a digital map with information about road geometry.

The vehicle 100 can include various modules, at least some of which will be described herein. The modules can be implemented as computer readable program code that, when executed by a processor, implement one or more of the various processes described herein. One or more of the modules can be a component of the processor 110, or one or more of the modules can be executed on and/or distributed among other processing systems to which the processor 110 is operatively connected. The modules can include instructions (e.g., program logic) executable by the processor 110. Alternatively or in addition, the data store 115 may contain such instructions.

The vehicle 100 can include an autonomous driving module 120. The autonomous driving module 120 can be configured to determine travel path(s) for the vehicle 100, turning paths for the vehicle 100, current driving maneuvers for the vehicle 100, future driving maneuvers and/or modifications. The autonomous driving module 120 can also cause, directly or indirectly, such path(s), driving maneuvers, and/or modifications thereto to be implemented. The autonomous driving module 120 can include instructions to execute various vehicle functions and/or to transmit data to, receive data from, interact with, and/or control the vehicle 100 or one or more systems thereof (e.g. one or more of vehicle systems 145).

The vehicle 100 can include a sensor system 125. The sensor system 125 can include one or more sensors. "Sensor" means any device, component and/or system that can detect, determine, assess, monitor, measure, quantify and/or sense something. The one or more sensors can be configured to detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 125 includes a plurality of sensors, the sensors can work independently from each other. Alternatively, two or more of the sensors can work in combination with each other. In such case, the two or more sensors can form a sensor network. The sensor system 125 and/or the one or more sensors can be operatively connected to the processor 110, the data store 115, the autonomous driving module 120 and/or other element of the vehicle 100.

The sensor system 125 can include any suitable type of sensor. For example, the sensor system 125 can include one or more sensors configured to detect, determine, assess, monitor, measure, quantify and/or sense information about the vehicle 100. Alternatively or in addition, the sensor system 125 can include one or more sensors configured to detect, determine, assess, monitor, measure, quantify and/or sense information about the external environment in which the vehicle 100 is located, including information about objects in the external environment. Such objects may be stationary objects and/or dynamic objects. Alternatively or in addition to one or more of the above examples, the sensor system 125 can include one or more sensors configured to detect, determine, assess, monitor, measure, quantify and/or sense the location of the vehicle 100 and/or the location of objects in the environment relative to the vehicle 100. Various examples of these and other types of sensors will be described herein. It will be understood that the embodiments are not limited to the particular sensors described.

The sensor system 125 can include one or more sensors configured to detect, determine, assess, monitor, measure, quantify and/or sense position and orientation changes of the vehicle 100, such as, for example, based on inertial acceleration. In one or more arrangements, the sensor system 125 can include accelerometers, gyroscopes and/or other suitable sensors. The sensor system 125 can include sensors that can monitor one or more internal systems of the vehicle 100 (e.g., an $O_2$ monitor, a fuel gauge, an engine oil temperature, coolant temperature, etc.). In one or more arrangements, the sensor system 125 can include a speedometer (not shown). The speedometer can determine a current speed of the vehicle 100, or data acquired by the speedometer can be used to determine a current speed of the vehicle 100. In one or more arrangements, the vehicle 100 can have a yaw rate sensor (not shown).

The sensor system 125 can include one or more sensors configured to sense the external environment of the vehicle 100 or portions thereof. For instance, the sensor system 125 can be configured to acquire data of at least a forward portion of an external environment of the vehicle 100. "Forward portion" means a portion of the external environment that is located in front of the vehicle in the travel direction of the vehicle. Such environment sensors can be configured to detect, determine, assess, monitor, measure, quantify and/or sense objects in at least a portion of the external environment of the vehicle 100 and/or information/data about such objects. Various examples of such sensors will be described herein. However, it will be understood that the embodiments are not limited to the particular sensors described.

In one or more arrangements, the sensor system 125 can include one or more radar sensors 127. "Radar sensor" means any device, component and/or system that can detect, determine, assess, monitor, measure, quantify and/or sense something using at least in part radio signals. The one or more radar sensors 127 can be configured to detect, determine, assess, monitor, measure, quantify and/or sense, directly or indirectly, the presence of one or more objects in the external environment of the vehicle 100, the position of each detected object relative to the vehicle 100, the distance between each detected object and the vehicle 100 in one or more directions (e.g. in the longitudinal direction 104, the lateral direction 106 and/or other direction(s)), the elevation of each detected object, the speed of each detected object and/or the movement of each detected object. The one or more radar sensors 127, or data obtained thereby, can determine or be used to determine the speed of objects in the external environment of the vehicle 100. The one or more radar sensors 127 can have three dimensional coordinate data associated with it the objects.

In one or more arrangements, the sensor system 125 can include one or more lidar sensors 128. "Lidar sensor" means any device, component and/or system that can detect, determine, assess, monitor, measure, quantify and/or sense something using at least in part lasers. The lidar sensor can include a laser source and/or laser scanner configured to emit a laser signal and a detector configured to detect reflections of the laser signal. The lidar sensor may be configured to operate in a coherent or an incoherent detection mode.

The one or more lidar sensors 128 can be configured to detect, determine, assess, monitor, measure, quantify and/or sense, directly or indirectly, the presence of one or more objects in the external environment of the vehicle 100, the position of each detected object relative to the vehicle 100, the distance between each detected object and the vehicle 100 in one or more directions, the elevation of each detected object, the speed of each detected object, and/or the movement of each detected object.

Alternatively or in addition to any of the sensors described above, the sensor system 125 can include other types of sensors. As an example, the sensor system 125 can include one or more sonar sensors (not shown). The sensor system 125, the processor 110, and/or one or more other elements of the vehicle 100 can be configured to detect forward vehicles relative position and velocity in the same travel lane as the present vehicle or in neighboring travel lanes.

The vehicle 100 can include one or more cameras 129. "Camera" is defined as any device, component, and/or system that can capture visual data. "Visual data" includes video and/or image information/data. The visual data can be in any suitable form.

The one or more cameras 129 can be high resolution cameras. The high resolution can refer to the pixel resolution, the spatial resolution, spectral resolution, temporal resolution and/or radiometric resolution. In one or more arrangements, the one or more cameras 129 can be high dynamic range (HDR) cameras or infrared (IR) cameras.

In one or more arrangements, one or more of the cameras 129 can include a lens (not shown) and an image capture element (not shown). The image capture element can be any suitable type of image capturing device or system, including, for example, an area array sensor, a Charge Coupled Device (CCD) sensor, a Complementary Metal Oxide Semiconductor (CMOS) sensor, a linear array sensor, a CCD (monochrome). The image capture element may capture images in any suitable wavelength on the electromagnetic spectrum. The image capture element may capture color images and/or grayscale images. The one or more of the cameras 129 can be configured with zoom in and/or zoom out capabilities.

In one or more arrangements, one or more of the cameras 129 can be oriented, positioned, configured, operable, and/or arranged to capture visual data from at least a portion of the external environment of the vehicle 100. In one or more arrangements, one or more cameras 129 can be oriented, positioned, configured, operable, and/or arranged to capture visual data from at least a forward portion of the external environment of the vehicle 100. As a further example, at least one camera 129 can be oriented, positioned, configured, operable, and/or arranged to acquire visual data from at least a left forward portion of the external environment of the vehicle 100. In such case, at least one camera 129 can be oriented, positioned, configured, operable, and/or arranged to acquire visual data from at least a right forward portion of the external environment of the vehicle 100.

The one or more cameras 129 can be located in any suitable portion of the vehicle 100. For instance, one or more of the cameras 129 can be located within the vehicle 100. One or more of the cameras 129 can be located on the exterior of the vehicle 100. One or more of the cameras 129 can be located on or exposed to the exterior of the vehicle 100. As an example, the one or more cameras 129 can be located in a central region at or near the front end 101 of the vehicle 100. As another example, one or more cameras 129 can be located on the roof of the vehicle 100.

The position of one or more of the cameras 129 can be fixed such that its position does not change relative to the vehicle 100. One or more of the cameras 129 can be movable so that its position can change to allow visual data from different portions of the external environment of the vehicle 100 to be captured. The movement of the cameras 129 can be achieved in any suitable manner. For instance, the cameras 129 can be rotatable about one or more axes, pivotable, slidable, and/or extendable, just to name a few possibilities. In one or more arrangements, the cameras 129 can have any suitable range of motion, including, for example, substantially spherical, substantially hemi-spherical, substantially circular and/or substantially linear. As used herein, the term "substantially" includes exactly the term it modifies and slight variations therefrom. Thus, for example, the term "substantially spherical" means exactly spherical and slight variations therefrom. The one or more cameras and/or the movement of the one or more cameras can be controlled by the camera system, the sensor system 125, the processor 110 and/or any one or more of the modules described herein or other module.

The sensor system 125, the processor 110, and/or one or more other elements of the vehicle 100 can be operable to control movements of one or more of the sensors of the sensor system 125. It should be noted that any of the sensors described herein can be provided in any suitable location with respect to the vehicle 100. For instance, one or more sensors can be located within the vehicle 100, one or more sensors can be located on the exterior of the vehicle and/or one or more sensors can be located so as to be exposed to the exterior of the vehicle 100.

The vehicle 100 can include an input system 130. An "input system" is defined as any device, component, system, element or arrangement or groups thereof that enable information/data to be entered into a machine. The input system 130 can receive an input from a vehicle occupant (e.g. a driver or a passenger). Any suitable input system 130 can be used, including, for example, a keypad, display, touch screen, multi-touch screen, button, joystick, mouse, trackball, microphone and/or combinations thereof.

The vehicle 100 can include an output system 131. An "output system" is defined as any device, component, system, element or arrangement or groups thereof that enable information/data to be presented to a vehicle occupant (e.g.

a person, a vehicle occupant, etc.). The output system 131 can present information/data to a vehicle occupant. The output system 131 can include a display, as described above. Alternatively or in addition, the output system 131 may include a microphone, earphone and/or speaker. Some components of the vehicle 100 may serve as both a component of the input system 130 and a component of the output system 131.

In one or more arrangements, the vehicle 100 can include a road marker identification module 132. In some arrangements, the road marker identification module 132 can be configured to detect, determine, assess, measure, analyze, recognize, and/or to identify travel lane markers and/or other road markers from data acquired by the sensor system 125 (e.g., visual data obtained by the one or more cameras 129 or other data). The road marker identification module 132 can identify road marker(s) using a machine vision system using any suitable technique, now known or later developed. The road marker identification module 132 can be configured to identify travel lane markers (e.g., any indicia on a road that designates at least a portion of the road for use by a single line of vehicles).

As an example, the road marker identification module 132 can also include any suitable object recognition software. The object recognition software can analyze an image captured by one or more cameras 129. In some instances, the object recognition software can query an object image database for possible matches. For instance, images captured by one or more cameras 129 can be compared to images in the object image database for possible matches. Alternatively or in addition, measurements or other aspects of visual data captured by one or more cameras 129 can be compared to measurements or other aspects of any images in the object image database. In some instances, the road marker identification module 132 can identify a travel lane marker if there is a match between the captured image and an image in the object database. "Match" or "matches" means that visual data acquired by one or more cameras 129 and one or more of the images in the object image database are substantially identical. For instance, the visual data acquired by one or more cameras 129 and one or more of the images in the object image database can match within a predetermined probability (e.g., at least about 85%, at least about 90%, at least about 95% or greater) or confidence level.

In one or more arrangements, the vehicle 100 can include a transverse turning vehicle detection module 133. The transverse turning vehicle detection module 133 can be configured to determine whether an object detected in the external environment of the vehicle 100 intends on turning through a center turn lane from a transverse direction. "Turning through a center turn lane from a transverse direction" includes when a vehicle wishes to turn left into an intended travel lane that has a different direction of travel than the current travel lane of the vehicle. The current travel lane of the object can be oriented transverse to a center turn lane. The current travel lane of the detected object can be oriented transverse to the center turn lane at any suitable angle. For instance, the angle can be about 90 degrees, obtuse (e.g., about 135 degrees, about 130 degrees, about 125 degrees, about 120 degrees, about 115 degrees, about 110 degrees, about 105 degrees, about 100 degrees, about 95 degrees, or other obtuse angle), or acute (e.g., about 85 degrees, about 80 degrees, about 75 degrees, about 70 degrees, about 65 degrees, about 60 degrees, about 55 degrees, about 50 degrees, about 45 degrees, or other acute angle).

The vehicle can turn or intend to turn left in such a way that it passes through the center turn lane in order to complete the left turn. Such a turn can include the vehicle initially turning into the center turn lane and traveling within it in a travel direction of the center turn lane until there is an opportunity to merge into the intended travel lane. Such a turn can also include initially turning into the center turn lane and stopping within the center turn lane to await an opportunity to merge into the intended travel lane. Such a turn can include the vehicle passing through the center turn lane without stopping in or traveling in a travel direction of the center turn lane. A "travel lane" is a portion of a road that is designated for use by a single line of vehicles and/or a portion of a road that is being used by a single line of vehicles. In some instances, the one or more travel lanes can be designated by markings on the road or in any other suitable manner. In some instances, the one or more travel lanes may not be marked.

The transverse turning vehicle detection module 133 can be configured to determine whether an object detected in the external environment of the vehicle 100 intends on turning through a center turn lane from a transverse direction in any suitable manner. For instance, the transverse turning vehicle detection module 133 can be configured to detect, determine, assess, measure, analyze, recognize, and/or to identify portions of a vehicle signaling system from data acquired by the sensor system 125 (e.g., visual data obtained by the one or more cameras 129 or other data). The transverse turning vehicle detection module 133 can identify turn signal lights of a vehicle (e.g., activated turn signal lights) using a machine vision system using any suitable technique, now known or later developed.

In some instances, the transverse turning vehicle detection module 133 can be configured to predict that a vehicle intends on turning through a center turn lane from a transverse direction if the vehicle foregoes one or more opportunities to turn in a direction that does not pass through the center turn lane (e.g. a right turn). In some instances, the transverse turning vehicle detection module 133 can be configured to detect non-verbal signals from the driver of a detected vehicle to determine that the driver intends on turning the vehicle through a center turn lane from a transverse direction. For instance, the transverse turning vehicle detection module 133 can be configured to detect, determine, assess, measure, analyze, recognize, and/or to identify non-verbal human signals from data acquired by the sensor system 125 (e.g., visual data obtained by the one or more cameras 129 or other data). Such non-verbal human signals can include hand gestures, the driver's face, or the direction in which the driver is looking.

In one or more arrangements, the vehicle 100 can include a turning path determination module 134. In one or more arrangements, the turning path determination module 134 can determine, estimate, and/or predict a turning path that a vehicle (e.g., the vehicle 100 or some other vehicle). "Turning path" is the general path that a vehicle will follow in order to complete a turn. For convenience, the terms "vehicle turning path" and "object turning path" may be used herein for convenience to facilitate the description. "Vehicle turning path" is used to describe the turning path associated with the vehicle 100. "Object turning path" is used to describe the turning path associated with a detected object.

The determination of a turning path can be performed in any suitable manner. The determination can be based on one or more factors. For instance, the determination can be at least partially based on one or more of the following factors:

a current location of the vehicle or object, a location of an travel lane into which the vehicle or object intends to turn (e.g., a general location and/or a location relative to the current location of the vehicle or object), the distance between the vehicle or object and the intended travel lane, other objects in the environment, one or more maneuvering characteristics of the vehicle 100, historical turning data of the vehicle 100, traffic rules or laws, safety, and/or the smoothness of the turn, just to name a few possibilities. In this context, "safety" means that the turning path would not result in damage, injury or endangerment of the vehicle 100 or object, occupants of the vehicle 100 or object, and/or persons or property located in the external environment (e.g. by collision). In one or more arrangements, artificial or computational intelligence algorithms or machine learning approaches can be used for determining a turning path.

The turning path determination module 134 can be configured to determine an adjusted turning path based on an actual, predicted, and/or theoretical change in position of the vehicle 100 and/or such a change in position of another vehicle or object in the external environment. The adjusted turning path can be determined in any suitable manner as described above. The adjusted turning path can be determined in real-time.

When the vehicle 100 is located in a center turn lane, the turning path determination module 134 can determine whether an object turning path for a detected object would impinge upon the autonomous vehicle in the center turn lane. The object turning path for a detected object would be considered to impinge upon the autonomous vehicle if the object turning path would result in the detected object and the vehicle 100 coming substantially close to each other. "Substantially close" means that the vehicle 100 and the detected object would contact each other and/or would be located within a predetermined distance of each other. The predetermined distance can be any suitable value, including, for example, about 10 feet or less, about 5 feet or less, about 4 feet or less, about 3 feet or less, about 2 feet or less or about 1 foot or less.

In one or more arrangements, the vehicle 100 can include a center turn lane behavior module 135. In some arrangements, the center turn lane behavior module 135 can be configured to determine a behavior for the vehicle 100 while the vehicle 100 is located in a center turn lane. Notably, at least with respect to a detected object that intends on turning through the center turn lane from a transverse direction, the vehicle 100 is not typically required to take any action with respect to such detected object. However, according to arrangements herein, the center turn lane behavior module 135 can determine an appropriate behavior for the vehicle 100 relative to such detected objects.

In one or more arrangements, the center turn lane behavior module 135 can be configured to make such a determination in response to determining whether an object turning path for the detected object would impinge upon the vehicle 100 in a center turn lane. If it is determined that the object turning path for the detected object would not impinge upon the vehicle 100 in a center turn lane, then the center turn lane behavior module 135 can determine that the vehicle 100 should remain in its current position in the center turn lane. If it is determined that the object turning path for the detected object would impinge upon the vehicle 100, then one or more driving maneuvers for the vehicle 100 can be determined. Any suitable driving maneuver can be implemented. For example, the driving maneuver can include moving the vehicle 100 forward within the center turn lane substantially in a longitudinal direction 104 of the vehicle 100. Alternatively or in addition, the driving maneuver can include moving the vehicle 100 within the center turn lane substantially in a lateral direction 106 of the vehicle 100. As a further example, the driving maneuver can include moving the vehicle 100 partially into a travel lane that is adjacent to the center turn lane.

The driving maneuver can result in the vehicle 100 being located in a new position within the center turn lane. In some instances, the determination of a suitable driving maneuver can be based on whether the driving maneuver can be safely implemented and/or if the new position would allow the vehicle 100 to safely complete a turn according to an adjusted vehicle turning path based on the new position within the center turn lane. "Safely implemented" means that the operation of the vehicle according to the determined driving maneuver would not result in damage, injury or endangerment of the vehicle, its occupants, or persons or property located in the external environment (e.g. by collision). "Safely complete a turn: means that the turning of the vehicle according to the adjusted turning path would not result in damage, injury or endangerment of the vehicle, its occupants, or persons or property located in the external environment (e.g. by collision).

In one or more arrangements, one or more of the modules 120, 132, 133, 134, 135 described herein can include artificial or computational intelligence elements, e.g., neural network, fuzzy logic or other machine learning algorithms. Further, in one or more arrangements, one or more of the modules 120, 132, 133, 134, 135 can be distributed among a plurality of the modules described herein. In one or more arrangements, two or more of the modules 120, 132, 133, 134, 135 described herein can be combined into a single module.

The vehicle 100 can include one or more vehicle systems 145. Various examples of the one or more vehicle systems 145 are shown in FIG. 1. However, the vehicle 100 can include more, fewer or different systems. It should be appreciated that although particular vehicle systems are separately defined, each or any of the systems or portions thereof may be otherwise combined or segregated via hardware and/or software within the vehicle 100. The vehicle 100 can include a propulsion system 150, a braking system 155, a steering system 160, throttle system 165, a transmission system 170, a signaling system 175, and/or a navigation system 180. Each of these systems will be described in turn below.

The propulsion system 150 can include one or more mechanisms, devices, elements, components, systems, and/or combinations thereof, now known or later developed, configured to provide powered motion for the vehicle 100. The braking system 155 can include one or more mechanisms, devices, elements, components, systems, and/or combinations thereof, now known or later developed, configured to decelerate the vehicle 100. The steering system 160 can include one or more mechanisms, devices, elements, components, systems, and/or combinations thereof, now known or later developed, configured to adjust the heading of the vehicle 100. The throttle system 165 can include one or more mechanisms, devices, elements, components, systems, and/ or combinations thereof, now known or later developed, configured to control the operating speed of an engine/motor of the vehicle 100 and, in turn, the speed of the vehicle 100.

The transmission system 170 can include one or more mechanisms, devices, elements, components, systems, and/ or combinations thereof, now known or later developed, configured to transmit mechanical power from the engine/ motor of the vehicle 100 to wheels or tires of the vehicle 100. The signaling system 175 can include one or more mechanisms, devices, elements, components, systems, and/or combinations thereof, now known or later developed, configured to provide illumination for the driver of the vehicle 100 and/or to provide information with respect to one or more aspects of the vehicle 100.

The vehicle 100 can include a navigation system 180. The navigation system 180 can include one or more mechanisms, devices, elements, components, systems, applications and/or combinations thereof, now known or later developed, configured to determine the geographic location of the vehicle 100 and/or to determine a travel route for the vehicle 100.

The navigation system 180 can include one or more mapping applications to determine a travel route for the vehicle 100. For instance, a driver or passenger may input an origin and a destination. The mapping application can determine one or more suitable travel routes between the origin and the destination. A travel route may be selected based on one or more parameters (e.g. shortest travel distance, shortest amount of travel time, etc.). In some arrangements, the navigation system 180 can be configured to update the travel route dynamically while the vehicle 100 is in operation.

The navigation system 180 can include a global positioning system, a local positioning system or a geolocation system. The navigation system 180 can be implemented with any one of a number of satellite positioning systems, such as the United States Global Positioning System (GPS), the Russian Glonass system, the European Galileo system, the Chinese Beidou system, or any system that uses satellites from a combination of satellite systems, or any satellite system developed in the future, including the planned Chinese COMPASS system and the Indian Regional Navigational Satellite System. Further, the navigation system 180 can use Transmission Control Protocol (TCP) and/or a Geographic information system (GIS) and location services.

The navigation system 180 may include a transceiver configured to estimate a position of the vehicle 100 with respect to the Earth. For example, navigation system 180 can include a GPS transceiver to determine the vehicle's latitude, longitude and/or altitude. The navigation system 180 can use other systems (e.g. laser-based localization systems, inertial-aided GPS, and/or camera-based localization) to determine the location of the vehicle 100.

Alternatively or in addition, the navigation system 180 can be based on access point geolocation services, such as using the W3C Geolocation Application Programming Interface (API). With such a system, the location of the vehicle 100 can be determined through the consulting of location information servers, including, for example, Internet protocol (IP) address, Wi-Fi and Bluetooth Media Access Control (MAC) address, radio-frequency identification (RFID), Wi-Fi connection location, or device GPS and Global System for Mobile Communications (GSM)/code division multiple access (CDMA) cell IDs. Thus, it will be understood that the specific manner in which the geographic position of the vehicle 100 is determined will depend on the manner of operation of the particular location tracking system used.

The processor 110 and/or the autonomous driving module 120 can be operatively connected to communicate with the various vehicle systems 145 and/or individual components thereof. For example, returning to FIG. 1, the processor 110 and/or the autonomous driving module 120 can be in communication to send and/or receive information from the various vehicle systems 145 to control the movement, speed, maneuvering, heading, direction, etc. of vehicle 100. The processor 110 and/or the autonomous driving module 120 may control some or all of these vehicle systems 145 and, thus, may be partially or fully autonomous.

The processor 110 and/or the autonomous driving module 120 may be operable to control the navigation and/or maneuvering of the vehicle 100 by controlling one or more of the vehicle systems 145 and/or components thereof. For instance, when operating in an autonomous mode, the processor 110 and/or the autonomous driving module 120 can control the direction and/or speed of the vehicle 100. The processor 110 and/or the autonomous driving module 120 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 140. The actuators 140 can be any element or combination of elements operable to modify, adjust and/or alter one or more of the vehicle systems 145 or components thereof to responsive to receiving signals or other inputs from the processor 110 and/or the autonomous driving module 120. Any suitable actuator can be used. For instance, the one or more actuators 140 can include motors, pneumatic actuators, hydraulic pistons, relays, solenoids, and/or piezoelectric actuators, just to name a few possibilities.

Now that the various potential systems, devices, elements and/or components of the vehicle 100 have been described, various methods will now be described. Referring now to FIG. 2, an example of a method of operating an autonomous vehicle while waiting to make a turn from a center turn lane is shown. Various possible steps of method 200 will now be described. The method 200 illustrated in FIG. 2 may be applicable to the arrangements described above in relation to FIG. 1, but it is understood that the method 200 can be carried out with other suitable systems and arrangements. Moreover, the method 200 may include other steps that are not shown here, and in fact, the method 200 is not limited to including every step shown in FIG. 2. The steps that are illustrated here as part of the method 200 are not limited to this particular chronological order. Indeed, some of the steps may be performed in a different order than what is shown and/or at least some of the steps shown can occur simultaneously.

At block 210, an object in the external environment of the vehicle 100 can be detected. The detecting can be performed continuously, periodically at any suitable interval, irregularly, or even randomly. The detecting can be performed by any suitable element or combination of elements of the vehicle 100. In one or more arrangements, the detecting can be performed by the sensor system 125 or one or more sensors thereof (e.g., radar sensor(s) 127, lidar sensor(s) 128, and/or camera(s) 129). The method 400 can continue to block 220.

At block 220, it can be determined whether the detected object intends on turning through the center turn lane from a transverse direction. Such determinations can be performed by any suitable element or combination of elements of the vehicle 100. In one or more arrangements, the determining of whether the detected object intends on turning through the center turn lane from a transverse direction can be performed, at least in part, by the transverse turning vehicle detection module 133 and/or the processor 110. Such determinations can be made using data acquired by the sensor system 125 (or component thereof). Such a determination can be made by identifying whether the object is another vehicle and/or identifying whether a left turn signal is activated. The method 200 can continue to block 230.

At block 230, responsive to determining that the detected object intends on turning through the center turn lane from a transverse direction, it can be determined whether an object turning path for the detected object would impinge upon the vehicle 100 in the center turn lane. The determination can be performed by any suitable element or combination of elements of the vehicle 100. In one or more arrangements, the determination can be performed, at least in part, by the turning path determination module 134, the autonomous driving module 120, and/or the processor 110. The method 200 can continue to block 240.

At block 240, it can be determined whether the object turning path for the detected object would impinge upon the vehicle 100 in the center turn lane. The determination of whether the object turning path for the detected object would impinge upon the vehicle 100 in the center turn lane can include determining whether the detected object will actually impinge upon the vehicle 100. Alternatively or in addition, the determination can include determining whether the detected object will pass within a predetermined distance from the vehicle 100. Such a determination can be made by the turning path determination module 134, the autonomous driving module 120, and/or the processor 110.

Responsive to determining that the object turning path for the detected object would impinge upon the vehicle 100 in the center turn lane, a driving maneuver for the vehicle 100 can be determined. Any suitable driving maneuver can be determined. The driving maneuver can be one that would result in the vehicle 100 being moved to a new position within the center turn lane. In such new position, the vehicle 100 would still be allowed to make the turn according to an adjusted vehicle turning path. The detected object would also be allowed to turn through the center turn lane according to an adjusted object turning path without impinging upon the vehicle 100. In one or more arrangements, the driving maneuver can include moving the vehicle 100 forward within the center turn lane substantially in the longitudinal direction 104 of the vehicle 100. In one or more arrangements, the driving maneuver can include moving the vehicle 100 within the center turn lane substantially in a lateral direction 106 of the vehicle 100. In one or more arrangements, the driving maneuver includes moving the vehicle 100 at least partially into a travel lane that is adjacent to the center turn lane. In one or more arrangements, the determining of the driving maneuver can be performed, at least in part, by the center turn lane behavior module 135, the autonomous driving module 120, and/or the processor 110. The method 200 can continue to block 250.

At block 250, the vehicle 100 can be caused to implement the determined driving maneuver. For instance, the center turn lane behavior module 135, the autonomous driving module 120, and/or the processor 110 can control the navigation and/or maneuvering of the vehicle 100 by controlling one or more of the vehicle systems 145 and/or components thereof. Such controlling can be performed directly or indirectly (e.g., by controlling one or more actuators 140). In one or more arrangements, causing the vehicle 100 to implement the determined driving maneuver can be performed responsive to receiving permission to implement the determined driving maneuver. In such case, a vehicle occupant can be prompted to provide permission to implement the determined driving maneuver. In one or more arrangements, causing the vehicle 100 to implement the determined driving maneuver can be performed automatically.

The method 200 can end. Alternatively, the method 200 can return to block 210. As a further alternative, the method 200 can include additional blocks (not shown). For instance, the method 200 can include, responsive to determining that the detected object does not intend on turning through the center turn lane from a transverse direction, maintaining a current position of the vehicle 100 within the center turn lane until there is an opportunity to turn or take some other appropriate action. Further, in some instances, it may not be possible to determine a driving maneuver for the vehicle 100 that would move the vehicle to a new position within the center turn lane that would allow the vehicle 100 to make the turn according to an adjusted vehicle turning path while also allowing the detected object to turn through the center turn lane according to an adjusted object turning path without impinging upon the vehicle 100. In such case, a current position of the vehicle 100 within the center turn lane can be maintained until there is an opportunity for the vehicle 100 to turn.

One non-limiting example of the operation of the vehicle 100 in accordance with the method 200 will now be described in relation to FIGS. 3A and 3B. For purposes of this example, the vehicle 100 is an autonomous vehicle and can be traveling in an external environment 300 that includes a first road 305 and a second road 310. As used herein, "road" means a thoroughfare, route, path or way between two places and upon which a vehicle can travel. A road may be paved or otherwise improved to facilitate travel by a vehicle thereon. In some instances, a road may be unpaved or undeveloped. A road may be a public road or a private road. A road can include or be a part of one or more bridges, tunnels, supporting structures, junctions, crossings, interchanges, and toll roads.

The first road 305 and the second road 310 can be oriented at any suitable angle with respect to each other. For instance, the first road 305 and the second road 310 can be oriented at substantially 90 degrees relative to each other, as is shown in FIGS. 3A and 3B. However, in one or more arrangements, the first road 305 and the second road 310 can be oriented at an acute angle with respect to each other. In one or more arrangements, the first road 305 and the second road 310 can be angled at an obtuse angle with respect to each other. The driving environment can include one or more additional roads, such as a third road 320. In some instances, the third road 320 can be a continuation of the second road 310.

The first road 305 and the second road 310 can have any suitable configuration and/or layout. The first road 305 and/or the second road 310 can be designated for two way travel, including a plurality of travel lanes. For purposes of this example, at least a portion of the first road 305 can include two travel lanes—a first travel lane 306 and a second travel lane 307. The first travel lane 306 can be intended or designated for vehicular travel in a first direction 308. The second travel lane 307 can be intended or designated for vehicular travel in a second direction 309. The first direction 308 can be substantially opposite to the second direction 309. The first and second travel lanes 306, 307 can be separated by a center turn lane 330.

For purposes of this example, the second road 310 can include two travel lanes—a third travel lane 311 and a fourth travel lane 312. The third travel lane 311 can be intended or designated for vehicular travel in a third direction 313. The fourth travel lane 312 can be intended or designated for vehicular travel in a fourth direction 314. The third direction 313 can be substantially opposite to the fourth direction 314.

In one or more arrangements, vehicles can enter the center turn lane 330 from the first travel lane 306 and/or the second travel lane 307. The center turn lane 330 can be designated for turning in one or more directions. To that end, the center turn lane 330 can, in at least some instances, include road markers 332 to indicate the types and/or directions of turns that are permitted and/or prohibited from the center turn lane 330. When in the center turn lane 330, a vehicle can make a left turn onto a transverse street or parking lot. Alternatively, a vehicle in the center turn lane 330 can make a U-turn to change from the first travel lane 306 to the second travel lane 307, or vice versa.

In some instances, one or more vehicles can turn through the center turn lane 330 from a transverse direction. As an example, an other vehicle 350 on the second road 310 may wish to turn left onto the second travel lane 307 of the first road 305. In such case, the other vehicle 350 may turn left and pass through the center turn lane 330 to reach the second travel lane 307. Alternatively, the other vehicle 350 may turn into the center turn lane 330 and travel along in the second direction 309 or wait within the center turn lane 330 for a period of time until there is an opportunity to merge into the second travel lane 307. Similarly, a vehicle (not shown) on the third road 320 may wish to turn left onto the first travel lane 306 of the first road 305.

It will be understood that arrangements shown and described herein with respect to the first road 305, the second road 310, the third road 320, and/or the center turn lane 330 are provided merely as examples, and arrangements are not limited to the particular arrangements shown and described. Indeed, arrangements described herein can be used in connection with roads having any quantity, type and/or arrangement of travel lanes.

The autonomous vehicle 100 can be traveling on the first road 305. The current travel path of the autonomous vehicle 100 can include turning left onto the third road 320. The autonomous vehicle 100 can be in the first travel lane 306 while traveling in the first direction 308. As it approaches the third road 320, the autonomous vehicle 100 can merge into the center turn lane 330 to await an opportunity to turn left onto the third road 320.

An other vehicle 350 can be traveling on the second road 310. The current travel lane of the other vehicle 350 can be the third travel lane 311, and it can be traveling in the third direction 313. The other vehicle 350 can come to a stop at or near a respective stop indicator. For purposes of this example, the other vehicle 350 can be a non-autonomous vehicle. However, it will be understood that arrangements described herein can be implemented even when the other vehicle 350 is an autonomous vehicle. The driver of the other vehicle 350 may wish to turn left from the second road 310 and into the second travel lane 307 of the first road 305. The signaling system of the other vehicle 350 can be activated as appropriate to indicate the driver's intention to make a left turn. For example, a left turn signal light 352 can be illuminated.

The above-described scenario is presented in FIG. 3A. The autonomous vehicle 100 is located in the center turn lane 330 awaiting an opportunity to make a left turn onto the third road 320. The autonomous vehicle 100 can determine a vehicle turning path 370 that the autonomous vehicle 100 will follow when making a turn. The other vehicle 350 is awaiting an opportunity to make a left turn onto the first road 305. There can be other vehicles in the environment 300, as is shown in FIG. 3A. It will be appreciated that the turning path for the other vehicle 350 to turn left is blocked by the autonomous vehicle 100. However, the autonomous vehicle 100 is not required to move to accommodate the other vehicle 350.

The autonomous vehicle 100 can detect the environment 300, such as by using one or more sensors of the sensor system 125. The autonomous vehicle 100 can detect the presence of other objects in the environment 300. In this example, the autonomous vehicle 100 can detect the presence of the other vehicle 350. The autonomous vehicle 100 can also determine whether the other vehicle 350 intends on turning through the center turn lane 330 from a transverse direction (e.g., from the second road 310). Such a determination can be performed in any suitable manner. For instance, the autonomous vehicle 100 can detect the illuminated left turn signal light 352 of the other vehicle 350. Alternatively, the autonomous vehicle 100 may be able to detect non-verbal signals (e.g., one or more hand signals) provided by a driver of the first other vehicle that indicate an intention to turn left. The detection of the other vehicle 350 and its intention to turn through the center turn lane 330 from a transverse direction can be determined by, for example, the transverse turning vehicle detection module 133 and/or the processor 110.

In response to determining that the other vehicle 350 intends on turning through the center turn lane 330 from the second road 310, the autonomous vehicle 100 can determine an object turning path 360 for the other vehicle 350. The object turning path 360 of the other vehicle 350 and/or the object turning path of the autonomous vehicle 100 can be determined by, for example, the turning path determination module 134 and/or the processor 110.

The autonomous vehicle 100 can also determine whether the object turning path 360 for the other vehicle 350 would impinge upon the autonomous vehicle 100. Such a determination can be made by, for example, the turning path determination module 134, the autonomous driving module 120, and/or the processor 110. If the autonomous vehicle 100 determines that the object turning path 360 for the other vehicle 350 would not impinge upon the autonomous vehicle 100, then the autonomous vehicle 100 can remain in its current position in the center turn lane 330. If the autonomous vehicle 100 determines that the object turning path 360 for the other vehicle 350 would impinge upon the autonomous vehicle 100, then one or more driving maneuvers for the autonomous vehicle 100 can be determined. The driving maneuver can be determined by the center turn lane behavior module 135, the autonomous driving module 120, and/or the processor 110.

The one or more driving maneuvers can result in the autonomous vehicle 100 being moved to a new position within the center turn lane 330, as is shown in FIG. 3B. From the new position, the autonomous vehicle 100 can make a left turn according to an adjusted vehicle turning path 371. The driving maneuver can be determined by the center turn lane behavior module 135, the autonomous driving module 120, and/or the processor 110. From the new position, the other vehicle 350 can turn left through the center turn lane 330 according to an adjusted object turning path 361 without impinging upon the autonomous vehicle 100. The driving maneuver can be determined by the turning path determination module 134, the center turn lane behavior module 135, the autonomous driving module 120, and/or the processor 110.

Any suitable driving maneuver can be implemented. For example, the driving maneuver can include moving the autonomous vehicle 100 forward within the center turn lane 330 substantially in a longitudinal direction 104 of the autonomous vehicle 100. Alternatively or in addition, the driving maneuver can include moving the autonomous vehicle 100 within the center turn lane 330 substantially in a lateral direction 106 of the autonomous vehicle 100. As a further example, the driving maneuver can include moving the autonomous vehicle 100 at least partially into a travel lane (e.g., the first travel lane 306 or the second travel lane 307) that is adjacent to the center turn lane 330.

It should be noted that if the autonomous vehicle 100 cannot determine a new position that would allow the autonomous vehicle 100 to safely complete its turn according to the adjusted vehicle turning path and/or that would allow the other vehicle 350 to turn through the center turn lane 330 according to the adjusted object turning path without impinging upon the autonomous vehicle 100, then the autonomous vehicle 100 can be configured to remain in its current position in the center turn lane 330.

The autonomous vehicle 100 can be caused (e.g. by the processor 110, the autonomous driving module 120, the center turn lane behavior module 135, and/or the actuators 140) to implement the determined driving maneuver. An example of the autonomous vehicle 100 implementing one example of a driving maneuver is shown in FIG. 3B. In particular, the driving maneuver is moving forward in the longitudinal direction of the autonomous vehicle 100 within the center turn lane 330. It should be noted that if at any point an opportunity to make its left turn arises, then the autonomous vehicle 100 can implement the left turn. Such implementation may occur before, during or after the driving maneuver is implemented.

It will be appreciated that arrangements described herein can provide numerous benefits, including one or more of the benefits mentioned herein. For example, arrangements described herein can improve the performance of an autonomous vehicle. Arrangements described herein can facilitate the safe operation of an autonomous vehicle. Arrangements described herein can minimize the gap between human behavior and system behavior. Arrangements described herein can enhance the reputation of an automaker's autonomous vehicle technology to realize safe real-world traffic scenes which may contain both automated vehicles and non-autonomous vehicles.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method of operating an autonomous vehicle while waiting to make a turn from a center turn lane, the method comprising:
determining, using at least one of one or more sensors or map data, that the autonomous vehicle is located in a center turn lane;
detecting an object in an external environment of the autonomous vehicle;
determining whether the detected object intends on turning through the center turn lane from a transverse direction;
responsive to determining that a detected object intends on turning through the center turn lane from a transverse direction, determining whether an object turning path for the detected object would impinge upon the autonomous vehicle in the center turn lane;
responsive to determining that the object turning path for the detected object would impinge upon the autonomous vehicle in the center turn lane, determining a driving maneuver for the autonomous vehicle that would move the autonomous vehicle to a new position within the center turn lane that would allow the autonomous vehicle to make a turn according to an adjusted vehicle turning path while also allowing the detected object to turn through the center turn lane according to an adjusted object turning path without impinging upon the autonomous vehicle; and
causing the autonomous vehicle to implement the determined driving maneuver.

2. The method of claim 1, wherein determining that the object turning path for the detected object would impinge upon the autonomous vehicle in the center turn lane includes determining whether the detected object will pass within a predetermined distance from the autonomous vehicle.

3. The method of claim 1, wherein the driving maneuver includes moving the autonomous vehicle forward within the center turn lane substantially in a longitudinal direction of the autonomous vehicle.

4. The method of claim 1, wherein the driving maneuver includes moving the autonomous vehicle within the center turn lane substantially in a lateral direction of the autonomous vehicle.

5. The method of claim 1, wherein the driving maneuver includes moving the autonomous vehicle at least partially into a travel lane that is adjacent to the center turn lane.

6. The method of claim 1, wherein determining whether the detected object intends on turning through the center turn lane from a transverse direction includes:
detecting an activated left turn signal of the detected object; and
determining that the detected activated left turn signal reflects an intended left turn from the transverse direction.

7. The method of claim 1, wherein causing the autonomous vehicle to implement the determined driving maneuver is performed automatically.

8. The method of claim 1, further including:
prompting an occupant of the autonomous vehicle for permission to implement the determined driving maneuver, wherein causing the autonomous vehicle to implement the determined driving maneuver is performed responsive to receiving permission to implement the determined driving maneuver.

9. The method of claim 1, further including:
responsive to determining that a detected object does not intend on turning through the center turn lane from a transverse direction, maintaining a current position of the autonomous vehicle within the center turn lane until there is an opportunity to turn.

10. A system for operating an autonomous vehicle while waiting to make a turn from a center turn lane, the system comprising:
a sensor system configured to detect an object in an external environment of the autonomous vehicle; and
a processor operatively connected to the sensor system, the processor being programmed to initiate executable operations comprising:
determining that the autonomous vehicle is located in a center turn lane;
determining whether the detected object intends on turning through the center turn lane from a transverse direction;
responsive to determining that a detected object intends on turning through the center turn lane from a transverse direction, determining whether an object turning path for the detected object would impinge upon the autonomous vehicle in the center turn lane;
responsive to determining that the object turning path for the detected object would impinge upon the autonomous vehicle in the center turn lane, determining a driving maneuver for the autonomous vehicle that would move the autonomous vehicle to a new position within the center turn lane that would allow the autonomous vehicle to make a turn according to an adjusted vehicle turning path while also allowing the detected object to turn through the center turn lane according to an adjusted object turning path without impinging upon the autonomous vehicle; and
causing the autonomous vehicle to implement the determined driving maneuver.

11. The system of claim 10, wherein determining that the object turning path for the detected object would impinge upon the autonomous vehicle in the center turn lane includes determining whether the detected object will pass within a predetermined distance from the autonomous vehicle.

12. The system of claim 10, wherein the driving maneuver includes moving the autonomous vehicle forward within the center turn lane substantially in a longitudinal direction of the autonomous vehicle.

13. The system of claim 10, wherein the driving maneuver includes moving the autonomous vehicle within the center turn lane substantially in a lateral direction of the autonomous vehicle.

14. The system of claim 10, wherein the driving maneuver includes moving the autonomous vehicle at least partially into a travel lane that is adjacent to the center turn lane.

15. The system of claim 10, wherein determining whether the detected object intends on turning through the center turn lane from a transverse direction includes:
detecting an activated left turn signal of the detected object; and determining that the detected activated left turn signal reflects an intended left turn from the transverse direction.

16. The system of claim 10, wherein causing the autonomous vehicle to implement the determined driving maneuver is performed automatically.

17. The system of claim 10, further including:
prompting an occupant of the autonomous vehicle for permission to implement the determined driving maneuver, wherein causing the autonomous vehicle to implement the determined driving maneuver is performed responsive to receiving permission to implement the determined driving maneuver.

18. The system of claim 10, further including:
responsive to determining that a detected object does not intend on turning through the center turn lane from a transverse direction, maintaining a current position of the autonomous vehicle within the center turn lane until there is an opportunity to turn.

19. A computer program product for operating an autonomous vehicle while waiting to make a turn from a center turn lane, the computer program product comprising a non-transitory computer readable storage medium having program code embodied therein, the program code executable by a processor to perform a method comprising:
determining, using at least one of data acquired by one or more sensors or map data, that the autonomous vehicle is located in a center turn lane;
determining whether a detected object intends on turning through the center turn lane from a transverse direction;
responsive to determining that a detected object intends on turning through the center turn lane from a transverse direction, determining whether an object turning path for the detected object would impinge upon the autonomous vehicle in the center turn lane;
responsive to determining that the object turning path for the detected object would impinge upon the autonomous vehicle in the center turn lane, determining a driving maneuver for the autonomous vehicle that would move the autonomous vehicle to a new position within the center turn lane that would allow the autonomous vehicle to make a turn according to an adjusted vehicle turning path while also allowing the detected object to turn through the center turn lane according to an adjusted object turning path without impinging upon the autonomous vehicle; and
causing the autonomous vehicle to implement the determined driving maneuver.

20. The computer program product of claim 19, wherein determining that the object turning path for the detected object would impinge upon the autonomous vehicle in the center turn lane includes determining whether the detected object will pass within a predetermined distance from the autonomous vehicle.

\* \* \* \* \*